US010088853B2

(12) United States Patent
Kolavennu

(10) Patent No.: US 10,088,853 B2
(45) Date of Patent: Oct. 2, 2018

(54) DEVICES AND METHODS FOR INTERACTING WITH AN HVAC CONTROLLER

(71) Applicant: Honeywell International Inc., Morristown, NJ (US)

(72) Inventor: Soumitri Kolavennu, Blaine, MN (US)

(73) Assignee: Honeywell International Inc., Morris Plains, NJ (US)

(*) Notice: Subject to any disclaimer, the term of this patent is extended or adjusted under 35 U.S.C. 154(b) by 643 days.

(21) Appl. No.: 13/875,213

(22) Filed: May 1, 2013

(65) Prior Publication Data

US 2013/0297078 A1 Nov. 7, 2013

Related U.S. Application Data

(60) Provisional application No. 61/641,778, filed on May 2, 2012.

(51) Int. Cl.
*G05D 23/19* (2006.01)
*G06Q 50/00* (2012.01)
(Continued)

(52) U.S. Cl.
CPC ........ *G05D 23/1917* (2013.01); *F24F 11/001* (2013.01); *G06F 17/30684* (2013.01);
(Continued)

(58) Field of Classification Search
None
See application file for complete search history.

(56) References Cited

U.S. PATENT DOCUMENTS 4,223,831 A 9/1980 Szarka
4,253,153 A 2/1981 Bitterli et al.
(Continued)

FOREIGN PATENT DOCUMENTS

CN 201225714 4/2009
CN 101947788 1/2011
(Continued)

OTHER PUBLICATIONS

"$T^2$ RERC Rehabilitation Engineering Research Center on Technology Transfer, Accessible Thermostat," 40 pages, downloaded Jun. 6, 2013.
(Continued)

*Primary Examiner* — Sean Shechtman
(74) *Attorney, Agent, or Firm* — Seager, Tufte & Wickhem, LLP

(57) ABSTRACT

An HVAC controller may be controlled in response to a natural language message that is not recognizable by the HVAC controller as a command, where the natural language message is translated into a command recognizable by the HVAC controller. Voice recognition software may be used to create a natural language text based message from a recorded voice message, where the natural language text based message is translated into the command recognizable by the HVAC controller. In response to the command, the HVAC controller may perform an action and/or respond with a natural language text based message. Where the HVAC controller responds to the natural language text based message, the HVAC controller may send a natural language text based message back to the user. In some cases, a user may communicate with the thermostat via an on-line social network.

10 Claims, 9 Drawing Sheets

(51) Int. Cl.
    *F24F 11/00* (2018.01)
    *G06F 17/30* (2006.01)
    *H04L 12/58* (2006.01)
(52) U.S. Cl.
    CPC ...... *G06Q 50/01* (2013.01); *F24F 2011/0057* (2013.01); *F24F 2011/0071* (2013.01); *H04L 51/32* (2013.01)

(56) References Cited

U.S. PATENT DOCUMENTS

| | | |
|---|---|---|
| 4,340,797 A | 7/1982 | Takano et al. |
| 4,353,502 A | 10/1982 | Myers |
| 4,381,549 A | 4/1983 | Stamp, Jr. et al. |
| 4,598,397 A | 7/1986 | Nelson et al. |
| 4,790,143 A | 12/1988 | Hanson |
| 5,065,813 A | 11/1991 | Berkeley et al. |
| 5,086,385 A | 2/1992 | Launey et al. |
| 5,123,252 A | 6/1992 | Hanson |
| 5,161,606 A | 11/1992 | Berkeley et al. |
| 5,284,024 A | 2/1994 | Hanson et al. |
| 5,345,226 A | 9/1994 | Rice, Jr. et al. |
| 5,395,042 A | 3/1995 | Riley et al. |
| 5,422,824 A | 6/1995 | Biehler et al. |
| 5,596,507 A | 1/1997 | Jones et al. |
| 5,682,329 A | 10/1997 | Seem et al. |
| 5,690,277 A | 11/1997 | Flood |
| 5,794,205 A | 8/1998 | Walters et al. |
| 6,083,270 A | 7/2000 | Scott |
| 6,385,510 B1 | 5/2002 | Hoog et al. |
| 6,413,079 B1 | 7/2002 | Lyons et al. |
| 6,526,335 B1 | 2/2003 | Treyz et al. |
| 6,584,439 B1 | 6/2003 | Geilhufe et al. |
| 6,608,560 B2 | 8/2003 | Abrams |
| 6,813,221 B1 | 11/2004 | Barr |
| 6,988,070 B2 | 1/2006 | Kawasaki et al. |
| 7,108,194 B1 | 9/2006 | Hankins, II |
| 7,139,716 B1 | 11/2006 | Gaziz |
| 7,146,253 B2 | 12/2006 | Hoog et al. |
| 7,162,253 B2 | 1/2007 | Vare et al. |
| 7,184,960 B2 | 2/2007 | Deisher et al. |
| 7,280,643 B2 | 10/2007 | Howard et al. |
| 7,349,758 B2 | 3/2008 | Miro et al. |
| 7,397,363 B2 | 7/2008 | Joao |
| 7,436,292 B2 | 10/2008 | Rourke et al. |
| 7,436,296 B2 | 10/2008 | Rourke et al. |
| 7,451,937 B2 | 11/2008 | Flood et al. |
| 7,454,269 B1 | 11/2008 | Dushane et al. |
| 7,464,035 B2 | 12/2008 | Funk et al. |
| 7,522,063 B2 | 4/2009 | Ehlers |
| 7,720,683 B1 | 5/2010 | Vermeulen et al. |
| 7,747,446 B2 | 6/2010 | Blass et al. |
| 7,752,047 B2 | 7/2010 | Morris |
| 7,890,334 B2 | 2/2011 | Park et al. |
| 7,899,912 B2 | 3/2011 | Bisdikian et al. |
| 7,957,974 B2 | 6/2011 | Cho et al. |
| 8,013,730 B2 | 9/2011 | Oh et al. |
| 8,019,567 B2 | 9/2011 | Steinberg et al. |
| 8,042,048 B2 | 10/2011 | Wilson et al. |
| 8,068,881 B2 | 11/2011 | Schrager |
| 8,078,472 B2 | 12/2011 | Resch et al. |
| 8,099,289 B2 | 1/2012 | Mozer et al. |
| 8,107,989 B2 | 1/2012 | Budampati et al. |
| 8,155,767 B2 | 4/2012 | ElMankabady et al. |
| 8,175,884 B1 | 5/2012 | Morris |
| 8,234,119 B2 | 7/2012 | Dhawan et al. |
| 8,239,922 B2 | 8/2012 | Sullivan et al. |
| 8,411,590 B2 | 4/2013 | Wang |
| 8,509,954 B2 | 8/2013 | Imes et al. |
| 8,630,742 B1 | 1/2014 | Stefanski et al. |
| 2002/0034956 A1 | 3/2002 | Mekuria |
| 2002/0123896 A1* | 9/2002 | Diez ................ F24F 11/006 704/275 |
| 2002/0193989 A1 | 12/2002 | Geilhufe et al. |
| 2003/0034898 A1 | 2/2003 | Shamoon et al. |
| 2003/0036909 A1 | 2/2003 | Kato |
| 2003/0088642 A1 | 5/2003 | Price et al. |
| 2003/0177012 A1 | 9/2003 | Drennan |
| 2003/0233432 A1 | 12/2003 | Davis et al. |
| 2004/0019489 A1* | 1/2004 | Funk .................. H04L 12/2803 704/275 |
| 2006/0161270 A1 | 7/2006 | Luskin et al. |
| 2006/0180676 A1 | 8/2006 | Park et al. |
| 2007/0135969 A1 | 6/2007 | Curl |
| 2007/0192486 A1 | 8/2007 | Wilson et al. |
| 2007/0204228 A1 | 8/2007 | Mincar |
| 2007/0263600 A1 | 11/2007 | Sutardja et al. |
| 2007/0286181 A1* | 12/2007 | Bushmitch ......... H04L 12/2803 370/356 |
| 2008/0037727 A1 | 2/2008 | Sivertsen et al. |
| 2008/0091432 A1 | 4/2008 | Dalton et al. |
| 2008/0175261 A1 | 7/2008 | Wang |
| 2008/0221714 A1 | 9/2008 | Schoettle |
| 2008/0233983 A1* | 9/2008 | Park .................. H04L 12/2818 455/466 |
| 2009/0059786 A1 | 3/2009 | Budampati et al. |
| 2009/0064295 A1 | 3/2009 | Budampati et al. |
| 2009/0086940 A1 | 4/2009 | Diethorn et al. |
| 2009/0143918 A1 | 6/2009 | Amundson et al. |
| 2009/0204262 A1 | 8/2009 | Nishimura |
| 2009/0204410 A1 | 8/2009 | Mozer et al. |
| 2009/0323904 A1 | 12/2009 | Shapiro et al. |
| 2010/0223055 A1* | 9/2010 | McLean .................. G10L 15/26 704/235 |
| 2010/0332235 A1* | 12/2010 | David .................. G06F 17/2785 704/275 |
| 2011/0046792 A1* | 2/2011 | Imes .................... F24F 11/0086 700/278 |
| 2011/0140914 A1 | 6/2011 | Pelech et al. |
| 2011/0210816 A1 | 9/2011 | Wang |
| 2011/0257971 A1 | 10/2011 | Chutorash et al. |
| 2011/0290893 A1 | 12/2011 | Steinberg |
| 2011/0307403 A1* | 12/2011 | Rostampour ........ G06Q 50/265 705/325 |
| 2012/0021684 A1 | 1/2012 | Schultz et al. |
| 2012/0066286 A1* | 3/2012 | Heredia .............. H04L 41/0806 709/201 |
| 2012/0123561 A1* | 5/2012 | Park ...................... G05B 15/02 700/3 |
| 2012/0136666 A1 | 5/2012 | Corpier et al. |
| 2012/0158161 A1 | 6/2012 | Cohn et al. |
| 2013/0006400 A1* | 1/2013 | Caceres ............. H04L 12/2803 700/90 |
| 2013/0117395 A1 | 5/2013 | Buschmitch et al. |
| 2013/0138250 A1 | 5/2013 | Mowery et al. |
| 2013/0183944 A1 | 7/2013 | Mozer et al. |
| 2014/0163751 A1 | 6/2014 | Davis et al. |
| 2014/0330435 A1 | 11/2014 | Stoner et al. |
| 2015/0053779 A1 | 2/2015 | Adamek et al. |
| 2015/0053780 A1 | 2/2015 | Nelson et al. |
| 2015/0053781 A1 | 2/2015 | Nelson et al. |

FOREIGN PATENT DOCUMENTS

| | | |
|---|---|---|
| CN | 202092667 | 12/2011 |
| CN | 102332204 | 1/2012 |
| CN | 102436273 | 5/2012 |
| EP | 1054387 | 11/2000 |
| EP | 1119191 | 7/2001 |
| EP | 1260886 | 11/2002 |
| EP | 1345360 | 7/2006 |
| EP | 1135757 | 11/2006 |
| EP | 1415218 | 2/2011 |
| EP | 2801972 A1 | 11/2014 |
| GB | 2094508 | 9/1982 |
| JP | 3803045 | 8/2006 |
| JP | 2006208460 | 8/2006 |
| JP | 2006317573 | 11/2006 |
| JP | 4503310 | 7/2010 |
| JP | 2010181064 | 8/2010 |
| JP | 4533844 | 9/2010 |
| JP | 2010236759 | 10/2010 |
| JP | 4640178 | 3/2011 |

(56) References Cited

FOREIGN PATENT DOCUMENTS

| JP | 4839605 | 12/2011 |
|---|---|---|
| KR | 20100026353 | 3/2010 |
| KR | 20110012048 | 2/2011 |
| KR | 20110045314 | 5/2011 |
| KR | 20120017492 | 2/2012 |
| KR | 101151571 | 5/2012 |
| WO | WO 93/13507 | 7/1993 |
| WO | WO 99/34339 | 7/1999 |
| WO | WO 2006/126192 | 11/2006 |
| WO | WO 2007/101164 | 9/2007 |
| WO | WO 2008/018102 | 2/2008 |
| WO | WO 2009/107211 | 9/2009 |
| WO | WO 2009/147927 | 10/2009 |

OTHER PUBLICATIONS

Brown, et al., "Joint DoD/Industry Study on Opportunities in Integrated Diagnostics," Institute for Defense Analysis, 110 pages, Jan. 1990.
Carrier Comfort Network, "Carrier Comfort System VVT$_{III}$," 6 pages, Aug. 1996.
Carvalho et al., "Voice Thermostat Remote Control," Proceedings of the IEEE 25$^{th}$ Annual Northeast Bioengineering Conference, pp. 59-60, Apr. 8-9, 1999.
Coleman (a Johnson Controls Company), "Hints for Homeowner's, A Thermostat That Speaks to Consumer's Needs," 1 page, on or before Jul. 20, 2006.
U.S. Appl. No. 13/911,638, filed Jun. 6, 2013.
Honeywell, "PM7006A Network Compatible Computer Room Air Conditioning (CRAC) Program Module for W7600 Control Module," 72 pages, Aug. 1993.
http://www.accendaproducts.com/kelvin/index.html, "Kelvin Voice Operated Thermostat," 2 pages, printed Dec. 9, 2013.
http://www.automatedliving.com, "Control Your Home by Voice or the Web, Anytime Anywhere," 1 page, printed Dec. 9, 2013.
http://www.broadenedhorizons.com/voiceir/, VoiceIR Environmental Voice Controller Configurator—Broadened Horizons, 17 pages, Dec. 9, 2013.
http://www.innotechsystems.com/voice.htm, "Voice Recognition & Voice Interactive Products," 1 page, printed Dec. 9, 2013.
http://www.rciautomation.com/thermostat_phone.htm, "Telephone Controlled Thermostat," 4 pages, printed Dec. 9, 2013.
http://www.talkingthermostats.com/blind.shtml, "Talking Thermostats for Persons who are blind," 3 pages, printed Dec. 12, 2013.
https://github.com/chilitechno/SiriProxy-NestLearningthermostat, "Siri Proxy-NestLearning Thermostat," 3 pages, printed Jan. 6, 2014.
https://github.com/plamoni/SiriProxy, "SiriProxy," 7 pages, printed Dec. 9, 2013.
Jacobson, "Design: A Voice Activated Thermostat," Biomedical Sciences Instrumentation, Technical Papers Composing the Proceedings of the 29$^{th}$ Annual Rocky Mountain Bioengineering Symposium & 29$^{th}$ International ISA Biomedical Sciences Instrumentation Symposium, vol. 28, pp. 15-19, 1992.
Lacquet et al., "Short Communications, An Affordable Digital-Display-to-Natural-Voice Converter for Visually Impaired Radio Amateurs," IEEE Transactions on Rehabilitation Engineering, vol. 4, No. No. 4, 6 pages, Dec. 1996.
Lee et al., "Fault Detection in an Air-Handling Unit Using Residual and Recursive Parameter Identification Methods," ASHRAE Transactions vol. 102, Pt. 1, pp. 1-22, 1996.
Lopez et al., "Temperature and Humidity Laboratory Remote Controller," Journal of the Mexican Society of Instrumentation, pp. 14-20, 1996.
Miles et al., "An Audible Thermostat for the Blind or Visually Challenged," Proceedings of the IEEE 23$^{rd}$ Northeast Bioengineering Conference, pp. 68-69, May 21-22, 1997.
Piette et al., "Model-Based Chiller Energy Tracking for Performance Assurance at a University Building," Cool Sense National Forum on Integrated Chiller Retrofits, San Francisco, Calif, LBNL Report-40781, 18 pages, Sep. 1997.
Talkingthermostats.com, "Comfort Solutions for Persons Who are Blind or have Low Vision, VIP 3000 Residential Talking Thermostat that Promotes Independent Living," 2 pages, on or before Aug. 19, 2011.
Venstar, "Comfort Call System ACCO433 Owner's Manual," 24 pages, Aug. 2007.
Walters, "Siri Hack Allows Voice Control of Home Thermostat," found at http://www.extremetech.com/computing/106073-siri-hack-allows-voice-control-of-home . . . , 2 pages, Nov. 21, 2011.
Watt, "Development of Empirical Temperature and Humidity-Based Degraded-Condition Indicators for Low-Tonnage Air-Conditioners," Thesis, ESL-TH-97/12-03, 205 pages, Dec. 1997.
Watt, "Predictive Maintenance Programs (PMP's) in Small HVAC Applications: Analysis of Available Products and Technology," ESL Report from Paper Prepared for MEEN 662, 4 pages, Apr. 1994.
Web.archive.org/web20030215020919/http:www.jdstechnologies.com/stargate.html, "Stargate Interactive Automation System: JDS Technologies," 9 pages, printed May 9, 2013.
Action Talking Products LLC, "Kelvin Installation Manual," V1.5, pp. 1-15, downloaded Jul. 14, 2015.
U.S. Appl. No. 14/737,076, filed Jun. 11, 2015.
https://storify.com/plumbingtips969/a-thermostat-that-speaks-to-a-consumer-s-needs, "A Thermostat That Speaks to a Consumer's Needs," 3 pages, printed Jul. 14, 2015.
SmartWay Solutions, Inc., "Talking Thermostat Model VT3000, User's Guide," pp. 1-20, downloaded Jul. 14, 2015.
Systems Controls & Instruments, LLC, "CEM-24 Series Owner's Manual—Installation and Operating Instructions," 32 pages, downloaded Jul. 14, 2015.
International Search Report for Corresponding Application No. PCT/US2013/039326 dated Jul. 23, 2013.
Office Action and Translation of the Office Action for Chinese Application No. 201380035240.9, dated Jun. 21, 2017.
Extended European Search Report for EP Application No. 14806841.4, dated Jan. 24, 2017.
Lennox, "icomfort Wi-Fi Thermostat, Touch Screen Programmable Communicating Thermostat," Homeowner's Manual, 21 pages, Sep. 2012.

* cited by examiner

DEVICES AND METHODS FOR INTERACTING WITH AN HVAC CONTROLLER

CROSS-REFERENCE TO RELATED APPLICATIONS

This application is related to and claims priority under 35 U.S.C. § 119(e) to U.S. Provisional Patent Application Ser. No. 61/641,778 entitled VOICE AND SOCIAL NETWORKING BASED INTERFACES FOR INTERNET CONNECTED THERMOSTATS, filed on the May 2, 2012 and incorporated herein by reference in its entirety for all purposes.

TECHNICAL FIELD

The present disclosure relates generally to HVAC systems, and more particularly to HVAC controllers that accommodate and/or facilitate control of an HVAC system from a remote location.

BACKGROUND

Heating, ventilation, and/or air conditioning (HVAC) systems are often used to control the comfort level within a building or other structure. Such HVAC systems typically include an HVAC controller that controls various HVAC components of the HVAC system in order to affect and/or control one or more environmental conditions within the building. In some cases, it may be desirable for a user to be able to affect the operation of an HVAC system from a remote location relative to the HVAC controller using, for example, an external web service or the like.

SUMMARY

The present disclosure pertains generally to HVAC systems, and more particularly to HVAC controllers that accommodate and/or facilitate control of an HVAC system from a remote location relative to the HVAC controller using a network. In one illustrative embodiment, an HVAC controller may control an HVAC system in accordance a command. The command may be translated from a message received from an online social network via a network. The received message may be translated into a command for an HVAC controller using translation software store in non-transitory computer readable medium.

In a further illustrative embodiment, a voice message may be recorded, where the voice message may be a natural language message that is not recognizable by the thermostat as a command. Using voice recognition software, a text based message of the recorded voice message may be created. With translation software store in a non-transitory computer readable medium, the test based message may be translated to a thermostat command that is recognizable by the thermostat for controlling the HVAC system.

In a further illustrative embodiment, a thermostat that is connected to a network and has a temperature sensor, and a controller may be capable communicating with and controlling one or more HVAC components of the HVAC system. In some cases, the controller of the thermostat may be configured to translate a natural language text based message that is not recognizable by the thermostat as a command into a thermostat command and perform an action in response to the thermostat command. In response to the natural language text based message, the thermostat may respond with a natural language text based message. In one example, the thermostat may respond to the natural language text based message by sending a text based message to an online social network.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments in connection with the accompanying drawings, in which.

Figure 1:
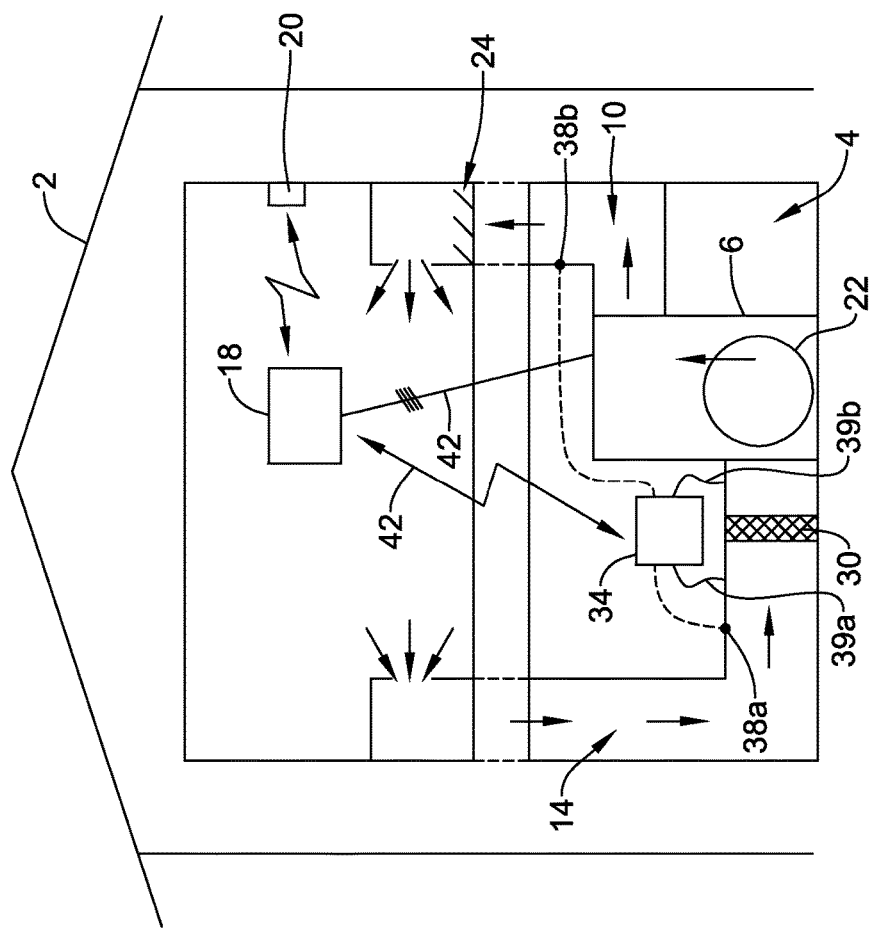
FIG. 1 is a schematic view of an illustrative HVAC system servicing a building or structure.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several embodiments which are meant to illustrative in nature.

FIG. 1 is a schematic view of a building 2 having an illustrative heating, ventilation, and air conditioning (HVAC) system 4. While FIG. 1 shows a typical forced air type HVAC system, other types of HVAC systems are contemplated including, but not limited to, boiler systems, radiant heating systems, electric heating systems, cooling systems, heat pump systems, and/or any other suitable type of HVAC system, as desired. The illustrative HVAC system 4 of FIG. 1 includes one or more HVAC components 6, a system of ductwork and air vents including a supply air duct 10 and a return air duct 14, and one or more HVAC controllers 18. The one or more HVAC components 6 may include, but are not limited to, a furnace, a heat pump, an electric heat pump, a geothermal heat pump, an electric heating unit, an air conditioning unit, a humidifier, a dehumidifier, an air exchanger, an air cleaner, a damper, a valve, and/or the like.

It is contemplated that the HVAC controller(s) 18 may be configured to control the comfort level in the structure or building 2 by activating and deactivating the HVAC component(s) 6 in a controlled manner. The HVAC controller(s) 18 may be configured to control the HVAC component(s) 6 via a wired or wireless communication link 20. In some cases, the HVAC controller(s) 18 may be a thermostat, such as, for example, a wall mountable thermostat, but this is not required in all instances. Such a thermostat may include (e.g. within the thermostat housing) or have access to a temperature sensor for sensing an ambient temperature at or near the thermostat. In some instances, the HVAC controller(s) 18 may be a zone controller, or may include multiple zone controllers each monitoring and/or controlling the comfort level within a particular zone in the building or other structure.

In the illustrative HVAC system 4 shown in FIG. 1, the HVAC component(s) 6 may provide heated air (and/or cooled air) via the ductwork 10, 14 throughout the building 2. As illustrated, the HVAC component(s) 6 may be in fluid communication with every room and/or zone in the building 2 via the ductwork 10 and 14, but this is not required. In operation, when a heat call or command signal is provided by the HVAC controller(s) 18, an HVAC component 6 (e.g. forced warm air furnace) may be activated to supply heated air to one or more rooms and/or zones within the building 2 via supply air ducts 10. The heated air may be forced through the supply air duct 10 by a blower or fan 22. In this example, the cooler air from each zone may be returned to the HVAC component 6 (e.g. forced warm air furnace) for heating via return air ducts 14. Similarly, when a cool call or command signal is provided by the HVAC controller(s) 18, an HVAC component 6 (e.g. air conditioning unit) may be activated to supply cooled air to one or more rooms and/or zones within the building or other structure via supply air ducts 10. The cooled air may be forced through supply air duct 10 by the blower or fan 22. In this example, the warmer air from each zone may be returned to the HVAC component 6 (e.g. air conditioning unit) for cooling via return air ducts 14. In some cases, the HVAC system 4 may include an internet gateway or other device 20 (e.g., a modem or other device) that may allow one or more of the HVAC components 6, as described herein, to communicate over a wide area network (WAN) such as, for example, the Internet, and/or a device 20 that may allow one or more HVAC components 6 to communicate over any other network.

In some cases, the system of vents or ductwork 10 and/or 14 can include one or more dampers 24 to regulate the flow of air, but this is not required. For example, one or more dampers 24 may be coupled to one or more HVAC controller(s) 18, and can be coordinated with the operation of one or more HVAC components 6. The one or more HVAC controller(s) 18 may actuate dampers 24 to an open position, a closed position, and/or a partially opened position to modulate the flow of air from the one or more HVAC components 6 to an appropriate room and/or zone in the building or other structure. The dampers 24 may be particularly useful in zoned HVAC systems 4, and may be used to control which zone(s) receives conditioned air from the HVAC component(s) 6.

In many instances, one or more air filters 30 may be used to remove dust and other pollutants from the air inside the building 2. In the illustrative example shown in FIG. 1, the air filter(s) 30 is installed in the return air duct 14, and may filter the air prior to the air entering the HVAC component 6, but it is contemplated that any other suitable location for the air filter(s) 30 may be used. The presence of the air filter(s) 30 may not only improve the indoor air quality, but may also protect the HVAC components 6 from dust and other particulate matter that would otherwise be permitted to enter the HVAC component 6.

In some cases, and as shown in FIG. 1, the illustrative HVAC system 4 may include an equipment interface module (EIM) 34. When provided, the equipment interface module 34 may be configured to measure or detect a change in a given parameter between the return air side and the discharge air side of the HVAC system 4. For example, the equipment interface module 34 may be adapted to measure a difference in temperature, flow rate, pressure, or a combination of any one of these parameters between the return air side and the discharge air side of the HVAC system 4. In some cases, the equipment interface module 34 may be adapted to measure the difference or change in temperature (delta T) between a return air side and a discharge air side of the HVAC system 4 for the heating and/or cooling mode. The delta T for the heating mode may be calculated by subtracting the return air temperature from the discharge air temperature (e.g. delta T=discharge air temp.-return air temp.). For the cooling mode, the delta T may be calculated by subtracting the discharge air temperature from the return air temperature (e.g. delta T=return air temp.-discharge air temp.).

In some cases, the equipment interface module 34 may include a first temperature sensor 38*a* located in the return (incoming) air duct 14, and a second temperature sensor 38*b* located in the discharge (outgoing or supply) air duct 10. Alternatively, or in addition, the equipment interface module 34 may include a differential pressure sensor including a first pressure tap 39*a* located in the return (incoming) air duct 14, and a second pressure tap 39*b* located downstream of the air filter 30 to measure a change in a parameter related to the amount of flow restriction through the air filter 30. In some cases, the equipment interface module 34, when provided, may include at least one flow sensor that is capable of providing a measure that is related to the amount of air flow restriction through the air filter 30. In some cases, the equipment interface module 34 may include an air filter monitor. These are just some examples.

When provided, the equipment interface module 34 may be capable of and/or configured to communicate with the HVAC controller 18 via, for example, a wired or wireless communication link 42. In other cases, the equipment interface module 34 may be incorporated or combined with the HVAC controller 18. In either case, the equipment interface module 34 may communicate, relay or otherwise transmit data regarding the selected parameter (e.g. temperature, pressure, flow rate, etc.) to the HVAC controller 18. In some cases, the HVAC controller 18 may use the data from the equipment interface module 34 to evaluate the system's operation and/or performance. For example, the HVAC controller 18 may compare data related to the difference in temperature (delta T) between the return air side and the discharge air side of the HVAC system 4 to a previously determined delta T limit stored in the HVAC controller 18 to determine a current operating performance of the HVAC system 4.

Depending upon the application and/or where the HVAC user is located, remote access and/or control of the HVAC controller 18 may be provided over a first network (e.g. a local WiFi network) and/or a second network (e.g. the Internet). A variety of remote devices 62 may be used to access and/or control the HVAC controller 18 from a remote location (e.g. remote from HVAC controller 18) over the first network and/or second network including, but not limited to, mobile phones including smart phones, PDAs, tablet computers, laptop or personal computers, wireless network-enabled key fobs, e-Readers and the like.

In many cases, the remote wireless devices 62 may be configured to communicate wirelessly over the first network and/or second network with the HVAC controller 18 via one or more wireless communication protocols including, but not limited to, cellular communication, ZigBee, REDLINK™, Bluetooth, WiFi, IrDA, dedicated short range communication (DSRC), EnOcean, and/or any other suitable common or proprietary wireless protocol, as desired.

In some cases, the HVAC controller 18 may be programmed to communicate over the first network and/or second network with an external web service hosted by one or more external web servers. A non-limiting example of such an external web service is Honeywell's TOTAL CONNECT™ web service. The HVAC controller 18 may be configured to upload selected data via the second network to the external web service where it may be collected and stored on the external web server 92. In some cases, the data may be indicative of the performance of the HVAC system 4. Additionally, the HVAC controller 18 may be configured to receive and/or download selected data, settings and/or services including software updates from the external web service over the first network and/or the second network. The data, settings and/or services may be received automatically from the web service, downloaded periodically in accordance with a control algorithm, and/or downloaded in response to a user request.

In some cases, for example, the HVAC controller 18 may be configured to receive and/or download an HVAC operating schedule and operating parameter settings such as, for example, temperature set points, humidity set points, start times, end times, schedules, window frost protection settings, and/or the like. In some instances, the HVAC controller 18 may be configured to receive one or more user profiles having at least one operational parameter setting that is selected by and reflective of a user's preferences. Additionally, the HVAC controller 18 may be configured to receive local weather data, weather alerts and/or warnings, major stock index ticker data, and/or news headlines over the second network. These are just some examples.

Figure 2:
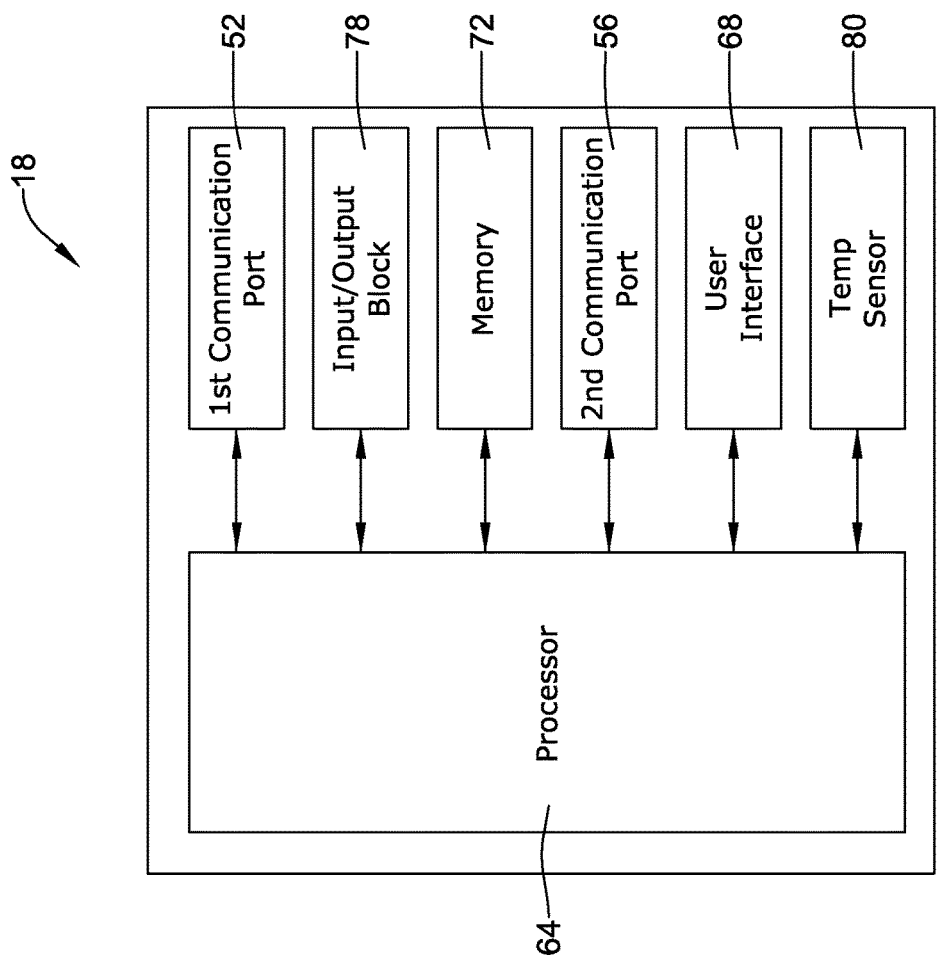
FIG. 2 is a schematic block diagram of an illustrative HVAC controller.

FIG. 2 is a schematic view of an illustrative HVAC controller 18 that may be accessed and/or controlled from a remote location over a network and/or accessed and/or controlled in any other manner using a wired or wireless remote device 62 (e.g., a mobile wireless device) 62 such as, for example, a smart phone, a PDA, a tablet computer, a laptop or personal computer, a wireless network-enabled key fob, an e-Reader, and/or the like. In some instances, the HVAC controller 18 may be a thermostat, but this is not required. As shown in FIG. 2, the illustrative HVAC controller 18 may include a first communications port 52 for communicating over first network (e.g. a first wireless network, a first wired network, a wireless LAN, a wired LAN, WAN, the internet, etc.) and a second communications port 56 for communicating over a second network (e.g. a second wireless network, a second wired network, a wireless LAN, a wired LAN, a WAN or the Internet). In one example, the first communications port 52 may be a wireless communications port including a wireless transceiver for wirelessly sending and/or receiving signals over a first wireless network. Similarly, the second communications port 56 may be a wireless communications port including a wireless transceiver for sending and/or receiving signals over a second wireless network. In some cases, the second communications port 56 may be in communication with a wired or wireless router or gateway for connecting to the second network, but this is not required. In some cases, the router or gateway may be integral to the HVAC controller 18 or may be provided as a separate device. Additionally, the illustrative HVAC controller 18 may include a processor (e.g. microprocessor, microcontroller, etc.) 64 and a memory 72. The HVAC controller 18 may also include a user interface 68, but this is not required.

In some cases, the HVAC controller 18 may include a timer (not shown). The timer may be integral to the processor 64 or may be provided as a separate component. The HVAC controller 18 may also optionally include an input/output block (I/O block) 78 for receiving one or more signals from the HVAC system 4 and/or for providing one or more control signals to the HVAC system 4. For example, the I/O block 78 may communicate with one or more HVAC components 6 of the HVAC system 4. Alternatively, or in addition, the I/O block 78 may communicate with another controller, which is in communication with one or more HVAC components of the HVAC system 4, such as a zone control panel in a zoned HVAC system, equipment interface module (EIM) (e.g. EIM 34 shown in FIG. 1) or any other building control device.

The HVAC controller 18 may also include an internal temperature sensor 80, but this is not required. In some cases, the HVAC controller 18 may communicate with one or more remote temperature sensors, humidity sensors, and/or occupancy sensors located throughout the building or structure. The HVAC controller may communicate with a temperature sensor and/or humidity sensor located outside of the building or structure for sensing an outdoor temperature and/or humidity if desired.

The processor 64 may operate in accordance with an algorithm that controls or at least partially controls one or more HVAC components of an HVAC system such as, for example, HVAC system 4 shown in FIG. 1. The processor 64, for example, may operate in accordance with a control algorithm that provides temperature set point changes, humidity set point changes, schedule changes, start and end time changes, window frost protection setting changes, operating mode changes, and/or the like. At least a portion of the control algorithm may be stored locally in the memory 72 of the HVAC controller 18 and, in some cases, may be received from an external web service over one or more of the first network and the second network. The control algorithm (or portion thereof) stored locally in the memory 72 of the HVAC controller 18 may be periodically updated in accordance with a predetermined schedule (e.g. once every 24 hours, 48 hours, 72 hours, weekly, monthly, etc.), updated in response to any changes to the control algorithm made by a user, updated in response to a user's request, and/or updated any other time, as desired. The updates to the control algorithm or a portion of the control algorithm stored in the memory 72 may be received from an external web service over one or more of the first network and the second network. In some cases, the portion of the control algorithm may include settings such as set points, schedule times, and/or other settings.

In some cases, the processor 64 may operate according to a first operating mode having a first temperature set point, a second operating mode having a second temperature set point, a third operating mode having a third temperature set point, and/or the like. In some cases, the first operating mode may correspond to an occupied mode and the second operating mode may correspond to an unoccupied mode. In some cases, the third operating mode may correspond to a holiday or vacation mode wherein the building or structure in which the HVAC system 4 is located may be unoccupied for an extended period of time. In other cases, the third operating mode may correspond to a sleep mode wherein the building occupants are either asleep or inactive for a period of time. These are just some examples. It will be understood that the processor 64 may be capable of operating in additional modes as necessary or desired. The number of operating modes and the operating parameter settings associated with each of the operating modes may be established locally through a user interface, and/or through an external web service and delivered to the HVAC controller 18 via one or more of the first network and the second network where they may be stored in the memory 72 for reference by the processor 64.

In some cases, the processor 64 may operate according to one or more predetermined operating parameter settings associated with a user profile for an individual user. The user profile may be stored in the memory 72 of the HVAC controller 18 and/or may be hosted by an external web service and stored on an external web server. The user profile may include one or more user-selected settings for one or more operating modes that may be designated by the user. For example, the processor 64 may operate according to a first operating mode having a first temperature set point associated with a first user profile, a second operating mode having a second temperature set point associated with the first user profile, a third operating mode having a third temperature set point associated with the first user profile, and/or the like. In some cases, the first operating mode may correspond to an occupied mode, the second operating mode may correspond to an unoccupied mode, and the third operating mode may correspond to a vacation or extended away mode wherein the building or structure in which the HVAC system 4 is located may be unoccupied for an extended period of time. In some cases, multiple user profiles may be associated with the HVAC controller 18. In certain cases where two or more user profiles are associated with the HVAC controller 18, the processor 64 may be programmed to include a set of rules for determining which individual user profile takes precedence for controlling the HVAC system when both user profiles are active.

In the illustrative embodiment of FIG. 2, the user interface 68, when provided, may be any suitable user interface that permits the HVAC controller 18 to display and/or solicit information, as well as accept one or more user interactions with the HVAC controller 18. For example, the user interface 68 may permit a user to locally enter data such as temperature set points, humidity set points, starting times, ending times, schedule times, diagnostic limits, responses to alerts, and the like. In one embodiment, the user interface 68 may be a physical user interface that is accessible at the HVAC controller 18, and may include a display and/or a distinct keypad. The display may be any suitable display. In some instances, a display may include or may be a liquid crystal display (LCD), and in some cases a fixed segment display or a dot matrix LCD display. In other cases, the user interface 68 may be a touch screen LCD panel that functions as both a display and keypad. The touch screen LCD panel may be adapted to solicit values for a number of operating parameters and/or to receive such values, but this is not required. In still other cases, the user interface 68 may be a dynamic graphical user interface.

In some instances, the user interface 68 need not be only physically accessible to a user at the HVAC controller 18. Additionally, or alternatively, the user interface 68 may be a virtual user interface 68 that is accessible via the first network and/or second network using a mobile wireless device or other device such as one of those remote devices 62 previously described herein. In some cases, the virtual user interface 68 may include one or more web pages that are broadcasted over the first network and/or the second network an internal web server implemented by the processor 64. When so provided, the virtual user interface 68 may be accessed over the first network and/or the second network using a remote device 62 such as any one of those listed above. Through the one or more web pages, the processor 64 may be configured to display information relevant to the current operating status of the HVAC system 4 including the current operating mode, temperature set point, actual temperature within the building, outside temperature, outside humidity and/or the like. Additionally, the processor 64 may be configured to receive and accept any user inputs entered via the virtual user interface 68 including temperature set points, humidity set points, starting times, ending times, schedule times, window frost protection settings, diagnostic limits, responses to alerts, and the like.

In other cases, the virtual user interface 68 may include one or more web pages that are broadcasted over the first network and/or the second network by an external web server. The one or more web pages forming the virtual user interface 68 may be hosted by an external web service and associated with a user account having one or more user profiles. The external web server may receive and accept any user inputs entered via the virtual user interface and associate the user inputs with a user's account on the external web service. If the user inputs include any changes to the existing control algorithm including any temperature set point changes, humidity set point changes, schedule changes, start and end time changes, window frost protection setting changes, operating mode changes, and/or changes to a user's profile, the external web server may update the control algorithm, as applicable, and transmit at least a portion of the updated control algorithm over the first network and/or second network the HVAC controller 18 where it is received via the first port 52 and/or second port 56 and may be stored in the memory 72 for execution by the processor 64.

The memory 72 of the illustrative HVAC controller 18 may be in communication with the processor 64. The memory 72 may be used to store any desired information, such as the aforementioned control algorithm, set points, schedule times, diagnostic limits such as, for example, differential pressure limits, delta T limits, and the like. The memory 72 may be any suitable type of storage device including, but not limited to, RAM, ROM, EPROM, flash memory, a hard drive, and/or the like. In some cases, the processor 64 may store information within the memory 72, and may subsequently retrieve the stored information from the memory 72.

In addition to interacting with a thermostat or other electronic device from a traditional keyboard, mouse, touch based interaction, a user interface on the thermostat, users may also seeking interaction with thermostat through social networking interfaces, voice recognition interfaces (e.g., voice to text and/or text to voice), and/or other interfaces. In some examples, an HVAC controller 18 (e.g., a thermostat) may have a social network account (or something similar thereto) that can be used to indicate and update its status from time to time. Additionally, or alternatively, the HVAC controller 18 may receive voice and/or text commands, sometimes in a natural language format like "increase temperature by 2 degrees" or user intention commands in a natural language format like "I am feeling cold" through social network communications (e.g., messages, posts, etc.), text based messages, voice messages, and/or other types of communications, as desired.

In some instances, the HVAC controller 18 may be capable of responding to natural language messages received through online social network communications (e.g., messages, posts, etc.), text based messages, voice messages, and/or other types of communications. A natural language interpreter (e.g., translation software) that receives messages over an online social network or the like, may interpret the intent behind the message, and translate the message into a command specific to the HVAC controller 18, and that can be understood or executed by the HVAC controller 18. The command may be an actual change of the state of the HVAC controller 18 (e.g., changing the set point or turning on the fan, etc.), a read the current state of the HVAC controller 18 type command (e.g., getting a current temperature as read by the thermostat, etc.), or any other suitable type of command as desired. In some instances, the translation software may be executed on the HVAC controller 18, while in some other instances, the translation software may be executed on devices separate or independent from the HVAC controller 18, such as at a remote server, remote user device, and/or in any other suitable device.

FIGS. 3-9 depict systems that allow for the use of online social networking interfaces for both controlling an HVAC controller 18 as well as receiving readings and/or messages from the HVAC controller 18. Another aspect discussed with respect to the Figures is the natural language interface for controlling the HVAC controller 18. Finally, a third aspect discussed with respect to the Figures is the elimination, if so desired, of any additional infrastructure (e.g., the infrastructure cloud 90 or other infrastructure in addition to the HVAC controller 18, a remote device 62, and the online social network 94 infrastructure) for making the thermostat Internet connected. In some instances, messaging to and/or interfacing with the HVAC controller 18 from the remote device 62 may be accomplished through the online social network 94, if desired.

Figure 3:
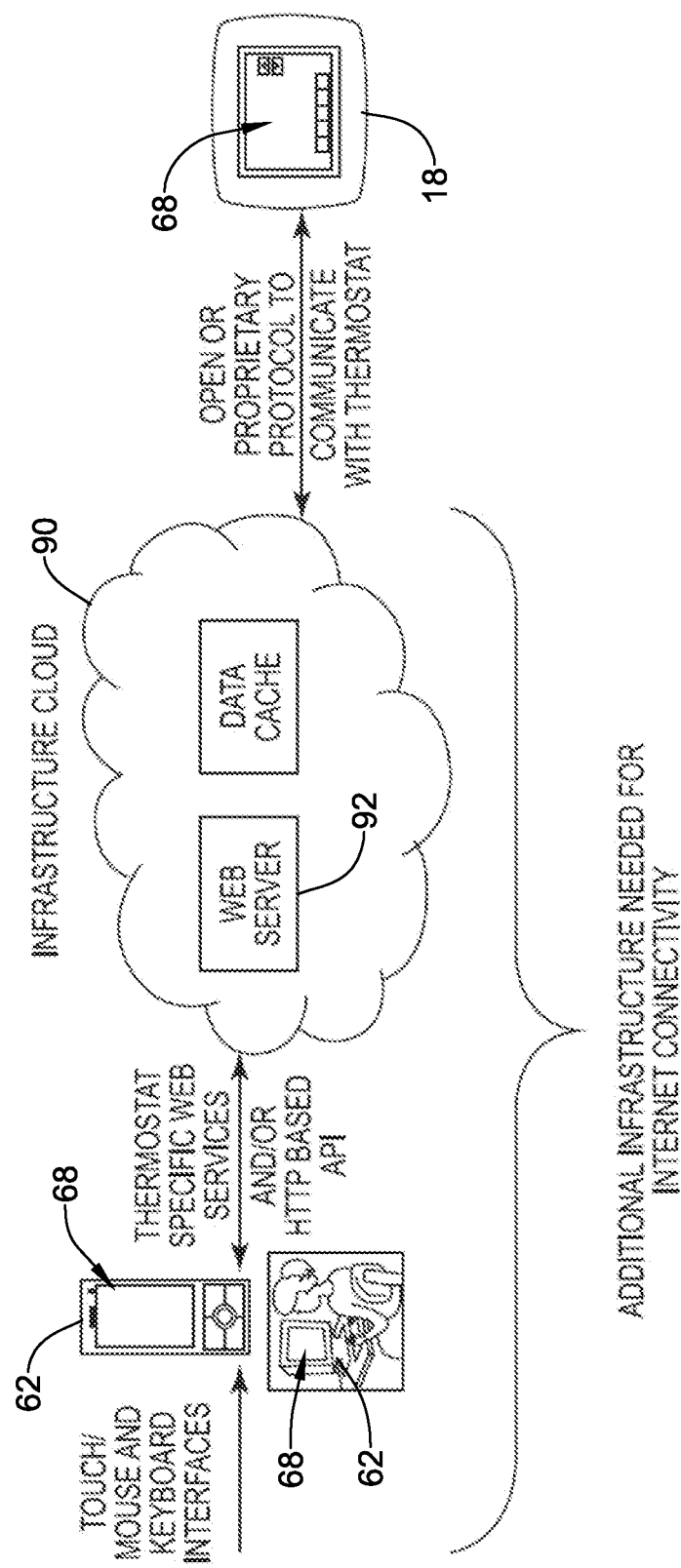
FIG. 3 is a schematic view of an illustrative thermostat interface network structure.

FIG. 3 is a schematic view of an illustrative thermostat interface network structure. In some cases, an HVAC controller 18 may utilize an open or proprietary protocol to communicate with any other devices (e.g., web server 92 with data cache) and/or remote devices 62. In order to expand the communication capabilities to include, voice, touch, mouse, keyboard, or other interfaces from remote locations, infrastructure in addition to the remote device 62, the open or proprietary protocol, and/or the HVAC controller 18 may be optionally included in the networked structure. Such additional infrastructure may include, for example, infrastructure of a cloud 90 and/or a web server 92 thereof, as shown in FIG. 3. The cloud or cloud infrastructure 90 (also known as, cloud computing) may include computing resources (e.g., hardware and/or software) capable of delivering a service over a network. The data cache stored in the cloud infrastructure 90 may store information about the HVAC controller 18. For example, the data cache may store the current status and/or settings of the HVAC controller 18, the model number, type and/or other information about the HVAC controller 18. Remote devices 62 may communicate with the cloud services and/or web server 92 via HVAC controller specific web services application programming interfaces (API) and/or HTTP-based APIs. For example, remote devices 62 may be configured to allow a user to set and/or modify settings for the HVAC controller 18 from a user interface 68 (e.g., an application or webpage) for controlling the HVAC controller 18, but remote from that HVAC controller 18.

Figure 4:
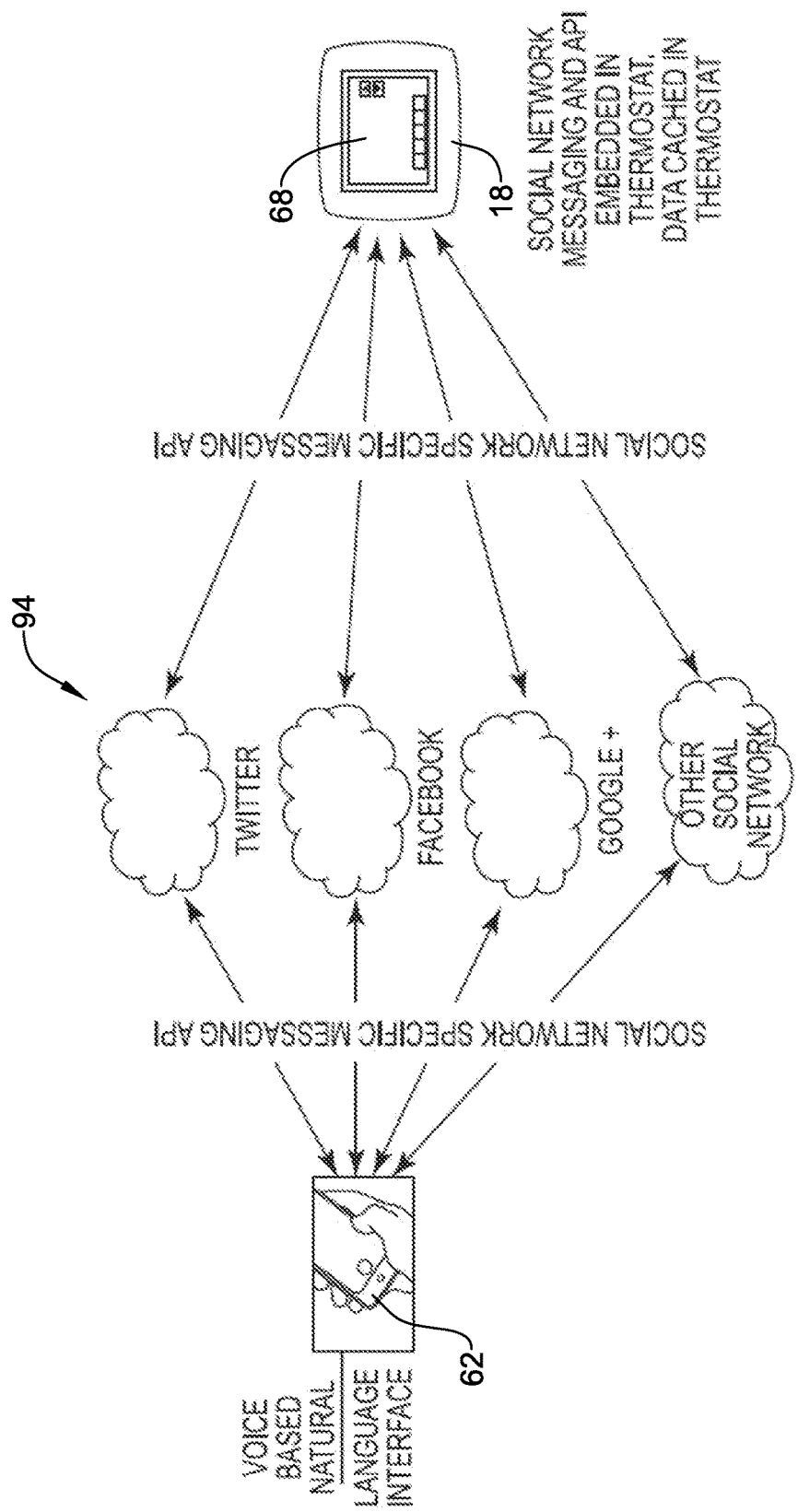
FIG. 4 is a schematic view of an illustrative social networking based interface structure for networked thermostats.

In some instances, a user interface 68 for interacting with the HVAC controller 18 via a remote device 62 may include the use of an online social network 94 (e.g., TWITTER™, FACEBOOK™, GOOGLE+™, and/or any other social network, sometimes using protocols such as hypertext transfer protocol (HTTP), transmission control protocol (TCP), Internet protocol (IP)), as shown for example in FIG. 4. Through the use of natural language messaging via online social networking messaging APIs, the user may be able to remotely command an HVAC controller 18 without the need for the HVAC controller's manufacturer to provide and/or maintain separate web servers and/or web services. An online social network is understood to be a platform to build social networks or social relations among people who, for example, may share interests, activities, backgrounds, and/or real-life connections.

In one example, a user may send a message to the HVAC controller 18 via a social network to command the HVAC controller 18 to take an action with respect to the HVAC system 4, where the data is cached in the memory 72 the HVAC controller 18 and the social network messaging interface and/or API are also stored in the memory 72 of the HVAC controller 18. In some cases, the message may be a natural language message, which may be a message that is not understandable as a command to action by the HVAC controller 18. In such cases, the message may be translated to a command that may be understood by the HVAC controller 18 as being a command for action. Once the message has been translated to a command understandable to the HVAC controller 18, the HVAC controller 18 may execute the command to control the HVAC system 4 in accordance with the command. In some instances, the HVAC controller 18 may send a return message through or to the online social network in response to receiving the message from the online social network. As a result of the communication between the user and the HVAC controller 18, and the ability of the HVAC controller to cache data and maintain a social network messaging interface and/or API in the memory 72 of the HVAC controller 18, the user may be able to remotely provide commands to the HVAC controller through the on-line social network, without the need for an HVAC controller manufacturer to deploy and/or maintain web server infrastructure and/or other similar or complementary infrastructure.

In some instances, a user of the HVAC controller 18 may be associated with and/or have an online account (e.g., a user account) with the online social network and, similarly, the HVAC controller 18 may be associated with the user's account and/or have a separate online account (e.g., separate user account) with the online social network. The online accounts of the user and/or the HVAC controller 18 may have the ability to view online profiles of the other's online account and/or send messages to the other's online account. For example, a user may post a message on the online social network 94 indicating "I am feeling cold" and the online account of the HVAC controller 18 may read the user's online account for HVAC system related commands in a natural language format (e.g., "increase temperature by 2 degrees") or intentions of the user in natural language (e.g., "I am feeling cold").

To facilitate the use of natural language text based messaging to command the HVAC controller 18, translation software (e.g., a natural language interpreter) may receive messages from the online social network 94 via a network. Illustratively, the translation software may be configured to understand the intent behind a natural language message and then, translate the natural language message into a specific commanded intended by the user when providing the natural language message. In some instances, the interpreted command may be an actual change of the state of the HVAC controller 18 (e.g., changing a set point temperature, turning the fan on/off, etc.) and/or the interpreted command may request a reading of a current state of the HVAC controller 18 (e.g., requesting a current temperature, a current humidity level, etc.). Illustratively, the translation software may reside on the HVAC controller 18, an HVAC controller manufacturer's web services cloud, and/or the translation software may be completely independent of the cloud server.

Figure 5:
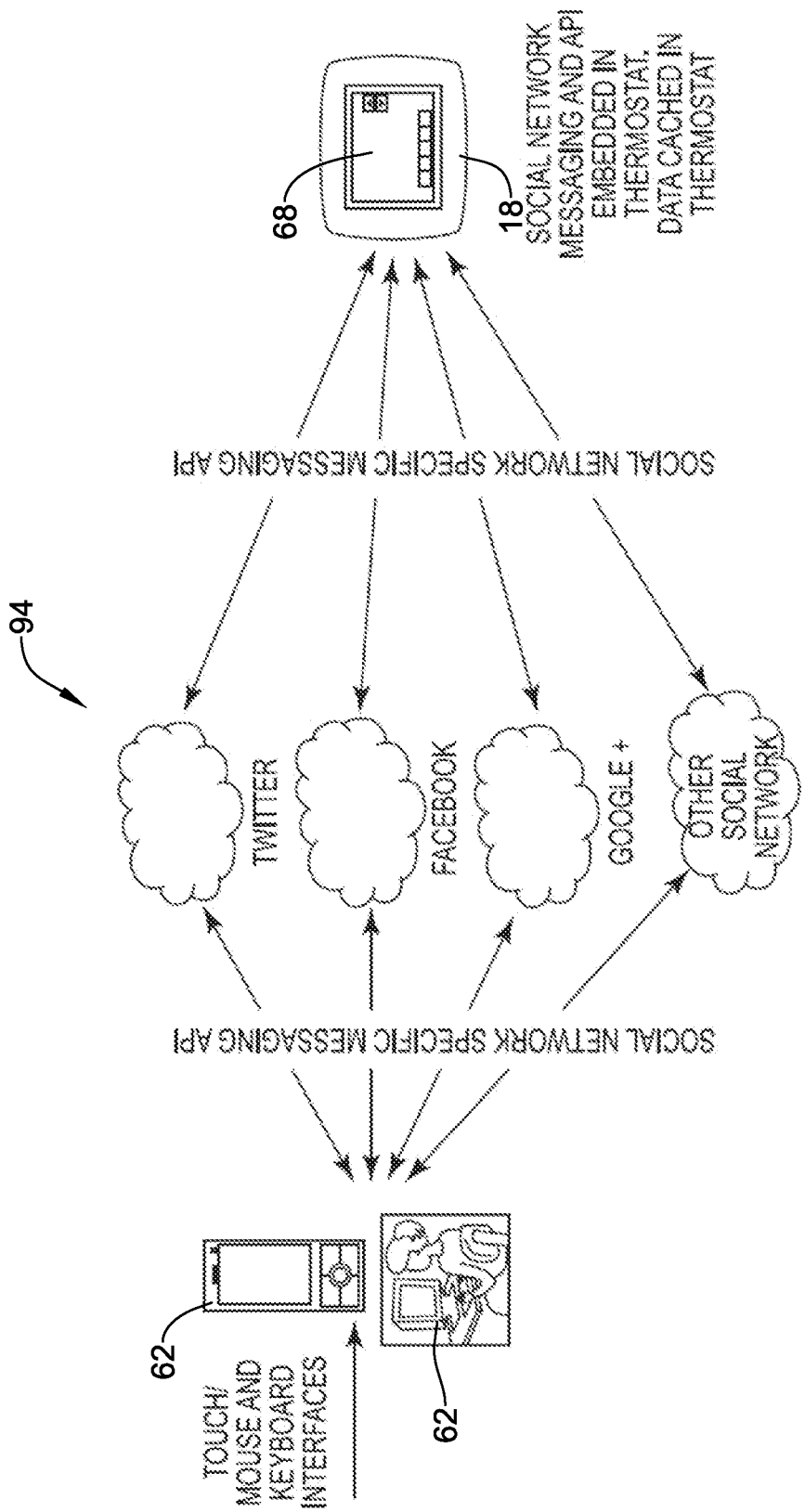
FIG. 5 is a schematic view of an illustrative social networking based interface structure for networked thermostats.

In some cases, the translation software may reside in the HVAC controller 18 itself. When the translation software resides in the HVAC controller 18, the HVAC controller 18 may receive a natural language message from the online social network through its connection to the internet, as shown in FIGS. 4 and 5. For example, the HVAC controller 18 may have software that allows it to receive and send messages using online social network APIs and/or online accounts for the online social networks. A user needing to interact with the HVAC controller 18 may send a message in natural language (e.g., "I am feeling cold", "increase temperature by 2 degrees", "change to heat mode", and/or "what is the temperature in my home" to the online account of the HVAC controller 18. The message may then be received at HVAC controller 18, and the translator software may be executed on the HVAC controller 18 to convert the message to a communication that is understandable to the HVAC controller 18. If the natural language message is interpreted as a command to change the state of the HVAC controller 18, the HVAC controller 18 will then change its state. In some instances, the command may take into account a current set point temperature of the HVAC controller 18 by raising or lowering the temperature set point based on an urgency of the message (e.g., "I am feeling cold" may result in raising the temperature from sixty-six (66) degrees to sixty-eight (68) degrees, but "I am feeling very cold" may result in raising the temperature from sixty-six (66) degrees to seventy-two (72) degrees based on rules in the translator software). If the message is interpreted as requesting the HVAC controller 18 to read its current state, the HVAC controller 18 may gather and report its current state.

In response to receiving a natural language message, the HVAC controller 18 may respond with a natural language text based message (or voice message, if appropriate). For example, the HVAC controller 18 may send a natural language response over the online social network informing the user of the change of the state of the HVAC controller 18, the current state of the HVAC controller 18, and/or any other message confirming the command was either successfully performed or unsuccessfully performed. The natural language text based message may be translated from a command language to natural language by the translator software, if desired.

In some instances, the user and/or the HVAC controller 18, from their online account(s), may post a message on the online social network, as opposed to sending messages directly an online account. For example, when the user posts "I am cold", and the online social network notes the user is at home when the post was made, the HVAC controller 18, via its online account with the social network, may track post from selected accounts and translate the posts into commands via the translation software in the memory 72 of the HVAC controller 18. The HVAC controller 18 may also perform an action in response to the command(s). In some cases, the HVAC controller 18 may respond to the post via its online account for the online social network with a natural language post of its own.

In some instances, the translation software may be independent of the HVAC controller 18 and may be resident in an HVAC controller manufacturer's web services server or otherwise in the HVAC controller web services cloud (e.g., an infrastructure cloud 90). In these instances, the users may be able to interact with the HVAC controller 18 via applications configured for remote devices 62, websites that may be interfaced with from remote devices 62, and/or through the online social network 94. The websites may reside on, and the applications may interact with, the web servers that are connected to the internet.

Figure 6:
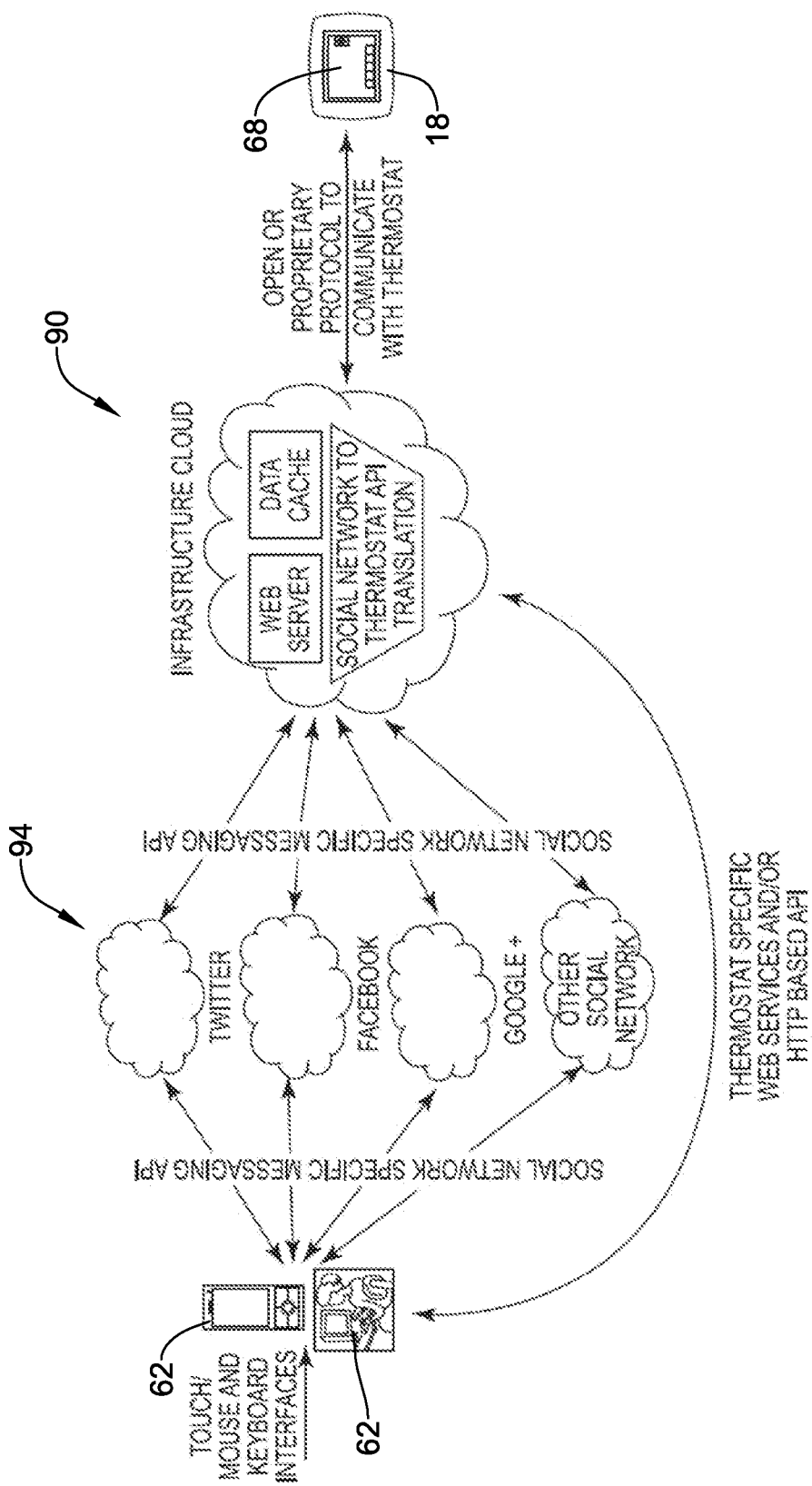
FIG. 6 is a schematic view of an illustrative social network to API translation structure embedded in the cloud for networked thermostats.
Figure 7:
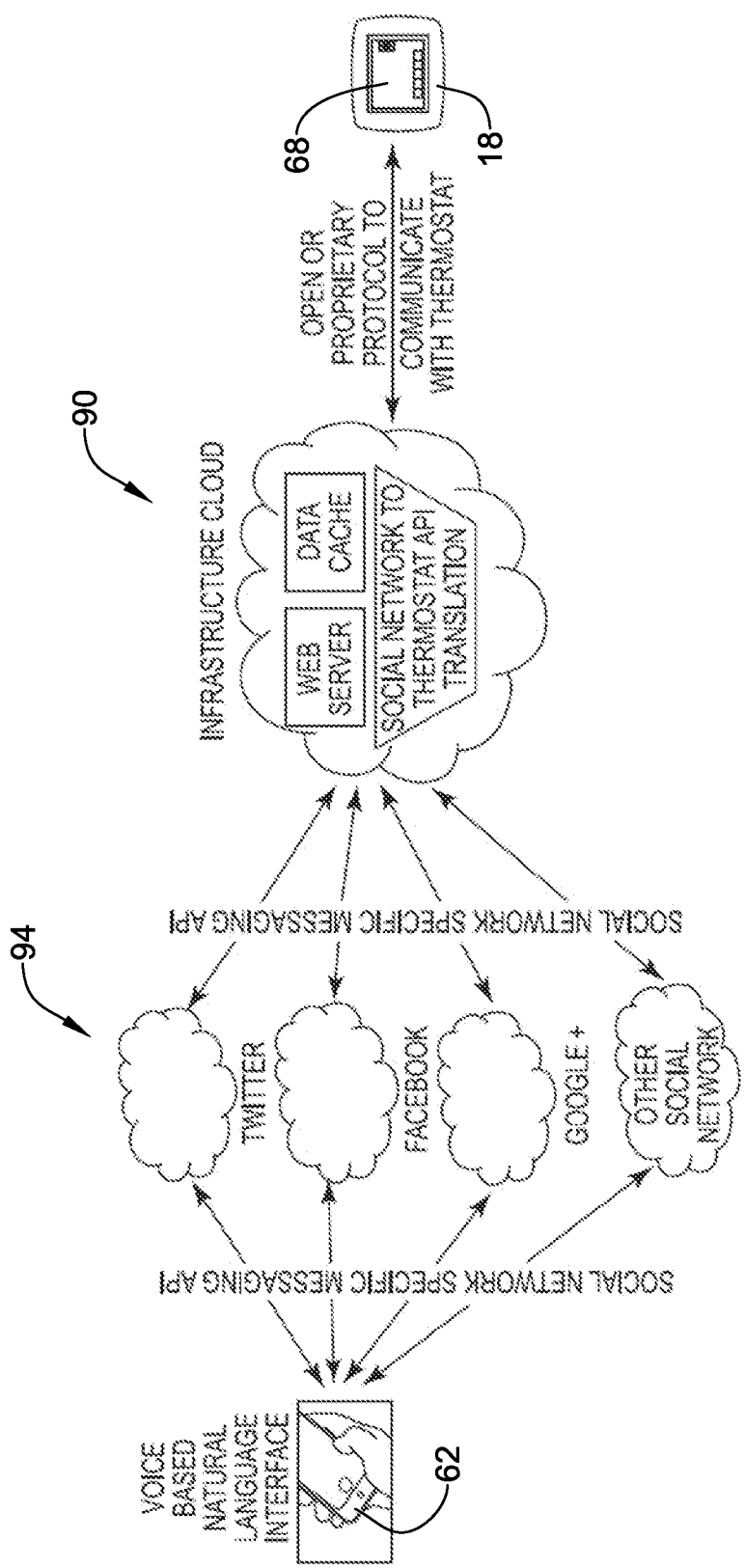
FIG. 7 is a schematic view of an illustrative social networking based interface structure for networked thermostats with voice interaction.

As shown in FIGS. 6 and 7, a user may interface with their remote device(s) 62 and communicate with the HVAC controller 18 through the online social network 94. In these instances, a natural language message may be received at an HVAC web services server 92 of the infrastructure cloud 90 from the online social network 94 or directly from one or more remote devices 62 though an HVAC controller 18 web services application and/or website. Then, translation software on the HVAC web services server 92 at the infrastructure cloud 90 may interpret the received natural language message into a command understandable by the HVAC controller 18. When formulating the command, the translation software may take into account one or more data points (e.g., a current set point temperature) stored in the data cache in the cloud infrastructure 90. For example, where the natural language message indicates "I am cold", the translation software may check the data cache for the current set point temperature of the HVAC controller 18 (e.g., seventy-two degrees) and provide a command to the HVAC controller 18 to set the set point temperature at seventy-four degrees. Once the natural language message has been translated into a command understandable by the HVAC controller 18, the command may be sent to the HVAC controller 18 over a network having an open or proprietary protocol (e.g., an HVAC web services interface protocol, such as a web services application programming interface (API)), for example. As the translation may require space in the memory 72 for its storage and processing power by the processor 64 for its operation, maintaining the translation software on the infrastructure cloud may reduce the memory and/or the processing power needed at the HVAC controller 18.

Figure 8:
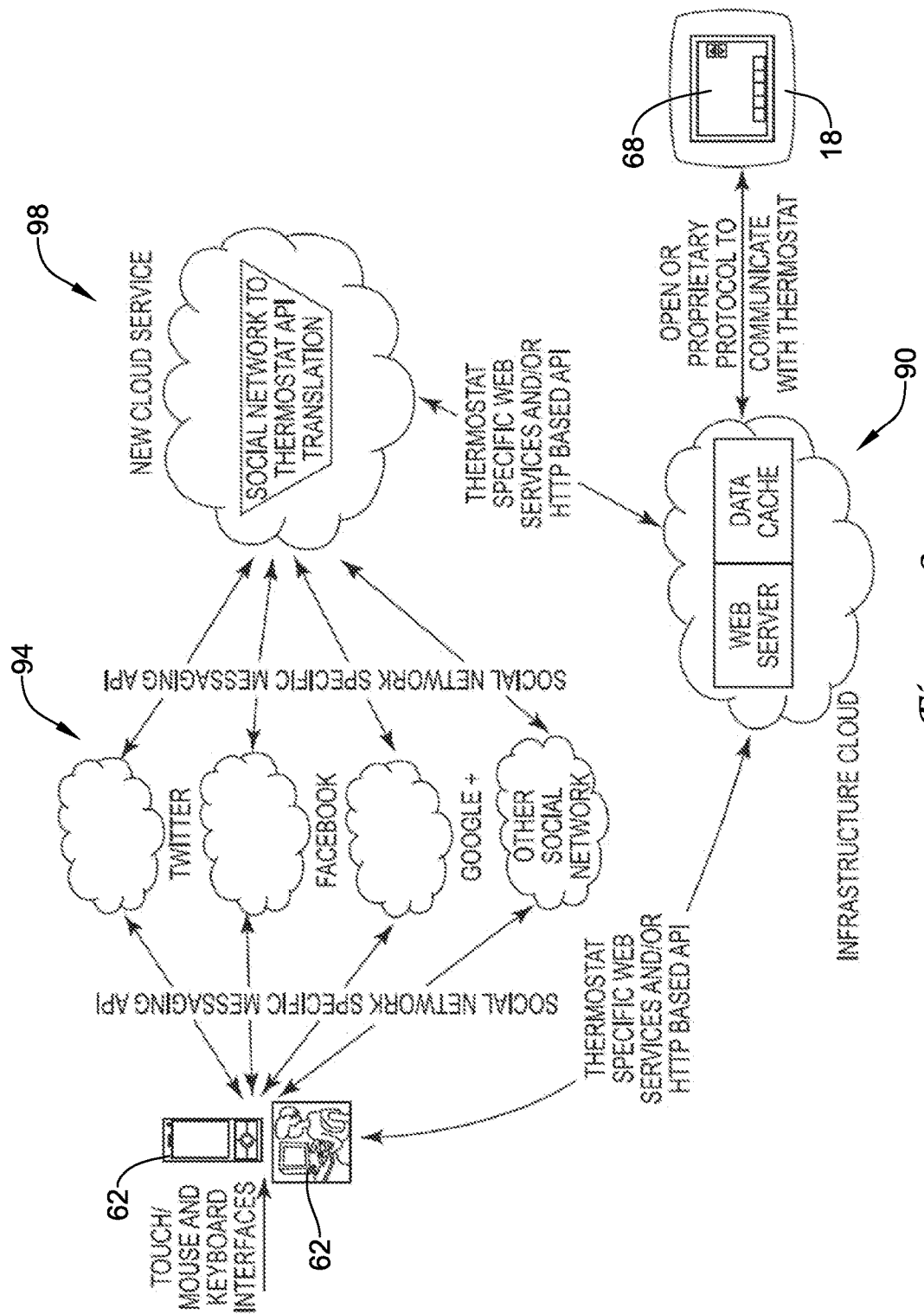
FIG. 8 is a schematic view of an illustrative social network to API translation structure within a separate cloud for networked thermostats.

In some instances, the translation software may be separate from the HVAC controller 18 and/or the infrastructure cloud 90, and may be stored at a separate cloud service 98 (see FIG. 8). The separate cloud service 98 may be separate from the HVAC controller 18 and/or the cloud infrastructure 90, but may be associated with the online social network and/or other cloud services. In these instances, the users may be able to interact with the HVAC controller 18 via applications configured for remote devices 62, websites that may be interfaced with remote devices 62, and/or through the online social network 94. The websites may reside on, and the applications may communicate with, the web servers at the infrastructure cloud 90, which may be separate from the HVAC controller 18 and/or the remote devices 62. Additionally, or alternatively, the separate cloud service 98 may include one or more websites and/or applications through which users may be able to send messages to command the HVAC controller 18.

Figure 9:
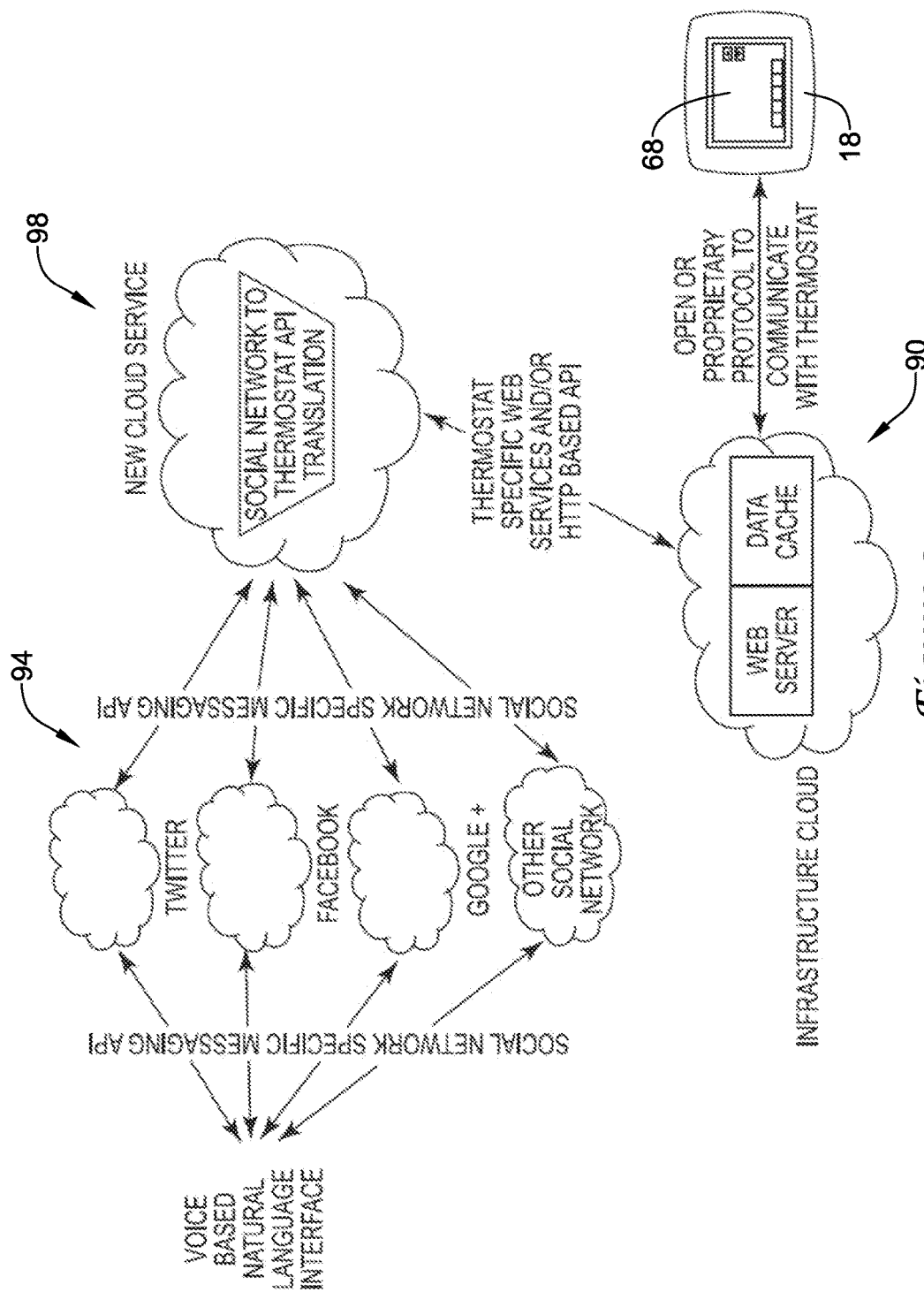
FIG. 9 is a schematic view of an illustrative social networking based interface structure for networked thermostats with voice interaction.

In the examples shown in FIGS. 8 and 9, when the translation software is stored at the separate cloud service 98, regardless of whether the user sends a natural language message to the online social network 94, the infrastructure cloud 90, or a separate cloud service, the message will pass through the separate cloud service 98 for translation into a command that is understandable by the HVAC controller 18, and through the infrastructure cloud 90 to be delivered to the HVAC controller 18 over an open or proprietary protocol. For example, if 1) a natural language message may be sent through the online social network, the online social network may pass the message to the separate cloud service 98 for translation into a command readable by an HVAC controller 18, and then, the command may be sent to the infrastructure cloud 90 to be sent to the HVAC controller 18; 2) a natural language message may be sent to the infrastructure cloud 90 via an application or website, the message may pass the message to the separate cloud service 98 from the infrastructure cloud 90 for translation into a command readable by the HVAC controller 18, and then, the command may be sent back to the infrastructure cloud 90 to be sent to the HVAC controller 18; and 3) a natural language message may be sent from a remote device 62 directly to the separate cloud service 98, the message may then be translated at the separate cloud service 98 into a command readable by the HVAC controller 18 and sent to the infrastructure cloud 90 to be sent to the HVAC controller 18.

In some cases, and in response to the translated command being received, the HVAC controller 18 may send a natural language message back to the user. The response from the HVAC controller 18 may be sent to the translation software stored at the separate cloud service 98 and translated into a natural language message. The natural language message may then be sent to the user via the infrastructure cloud 90 and associated websites and/or applications, the online social networks, and/or directly from the separate cloud service 98. In these examples, as the HVAC controller 18 interacts only with the infrastructure cloud 90, the HVAC controller 18 may be capable of operating with less memory and/or processing power as it is only required to store and operate a single web services API to interact with the infrastructure cloud 90.

FIGS. 4, 7, and 9 illustrate an online social network 94 based interface structure for networked thermostats with voice interaction. The present disclosure provides a mechanism where voice messages recorded on a non-transitory computer readable medium may be used as the messaging system between a user and an Internet connected HVAC controller 18. The voice commands may, for example, be received from a user by a remote device 62 in the vicinity of the user issuing the voice commands.

When voice interactions are used, it is contemplated that any suitable voice recognition software that may be used. For example, voice recognition software may be executed on the remote device 62, or at a remote server (e.g., Siri™). Alternatively, or in addition, voice recognition software may be added to the infrastructure cloud 90, and/or the separate cloud service 98 for communication with the HVAC device controller 18. Such voice recognition software may produce and/or translate the recorded and/or received user voice message into a natural language text based message. Once the received and/or recorded voice message has been translated into a natural language text based message, it may be translated into a command understandable to the HVAC controller 18 in one of the manners discussed herein or in any other manner.

In some instances, the voice recognition software may be configured on the remote device 62 and a short message service (SMS) communication of the translated voice message may be sent to the translation software. Any application utilizing voice recognition software that is capable of sending a SMS message may be used. For example, the Siri™ voice recognition software for Apple™ iOS mobile phones may be used to do voice recognition and then send an SMS message In one example, a voice input such as "Tell Thermostat to decrease temperature by 3 degrees" may be received and/or recorded at the remote device 62. This voice message includes two parts: 1) a command for the remote device 62 (e.g., "tell thermostat to"), and 2) a command for the HVAC controller 18 (e.g., "decrease the temperature by 3 degrees"). The voice recognition software may be configured to understand the command for the remote device 62 and, according to rules in the voice recognition software and/or other software of the remote device 62, send a SMS message with content "decrease temperature by 3 degrees" to a phone number or SMS number associated with a contact by the name of "Thermostat". In another example, using another voice recognition software application, like VLINGO™, the same messaging can be achieved by saying "Message to Thermostat decrease temperature by 3 degrees". Each different voice recognition software on a remote device 62 may have its own lexicon by which it operates, as desired. Through use of such systems, an HVAC controller 18 may be remotely controlled simply by recording and/or sending a voice message from a remote device to the HVAC controller 18 embodiment. In some instances, a user may simply type in a message, and when so provided, no voice recognition software may be needed.

Additionally, or alternatively, voice recognition software may be capable of and/or configured to translate a received and/or recorded voice message with a message to update or post to the online social network 94 and/or send a message through the online social network to the HVAC controller 18. For example using voice recognition software or a voice recognition application, such as the VLINGO™ application for mobile phones, a voice message such as "FACE-BOOK™ update increase temperature by 2 degrees" may instruct the remote device 62 or the voice recognition application to send an update to the users FACEBOOK™ account to "increase temperature by 2 degrees", or a message such as "TWITTER™ update I am feeling cold", may post a message to the user's TWITTER™ account that states "I am feeling cold". The translation software can be configured to receive a notification of the post to the online social network 94, a message from the online social network 94, or otherwise be capable of scanning the user's online social network account activities and/or feeds to search for HVAC system related text. Once the post, update, message, etc. has been viewed and/or received by the translation software, the voice recognition software, the translation software, the online social network 94 and/or other feature may delete the post, update, message, etc. and then convert the natural language text into one or more thermostat commands to make the changes described in the natural language text based message.

In some instances, the translation software may be stored in a non-transitory computer readably media on the remote device 62. In one example, the remote device 62 may receive and/or record a voice message from a user. Voice recognition software on the remote device 62 may recognize the voice message as a command for the HVAC controller 18 and translate the voice message into a natural language text based message. The voice recognition software may recognize the recorded and/or received message as an HVAC controller 18 command based on key word identification (e.g., the voice recognition software recognizes HVAC related terms such as "temp", "heat", "cool", etc.). Once the voice message has been translated into a natural language text based message, the text based message may be sent to the translation software for translation into an HVAC controller 18 understandable command.

When the translation software is stored on the remote device 62, the voice recognition software may be part of, may be intertwined with the translation software, or may be an application or a feature of the remote device 62 separate from the translation software that may be directly (e.g., the translation software uses the separate feature in its application) or indirectly (e.g., the translation software and the voice recognition applications do not operate in a single application) capable of interacting with the translation software. For example, the voice recognition software may be a mechanism for a user to interface with the translation software application, such that user may open the translation software application, speak to it, and the translation software may send a message directly to the HVAC controller 18 or indirect to the HVAC controller 18 through one or more of the online social network 94, the infrastructure cloud 90, and the separate cloud service 98.

In some instances, the voice recognition software and translation software may be stored in the memory 72 of the HVAC controller 18, such that the HVAC controller 18 may be directly receive and translate a voice message into an HVAC controller understandable command. For example, a user may issue one or more natural language voice message to the HVAC controller 18 when the user is in the vicinity of the HVAC controller 18. If the HVAC controller 18 has one or more remote sensors, the voice recognition and translation software may additionally, or alternatively, be stored in those sensors. For example, some HVAC controllers 18 may have remote temperature sensors and/or remote control devices that may be placed in different rooms in the house, and the voice recognition and translation software may be embedded in one or all of these sensors and/or remote control devices. As a result, HVAC controller 18 may receive a natural language voice message, translate the voice message to a command understandable by the HVAC controller 18, perform an action in response to the command, and/or respond to the received voice message with either a natural language text based message or with an audible natural language message as interpreted with a text-to-voice voice recognition software.

As discussed throughout, certain embodiments of the present disclosure may use natural language messaging (or other messaging) using an API of any social networking or similar providers to accomplish functions discussed herein.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A method of controlling an HVAC system, the method comprising:
   associating an HVAC controller of an HVAC system with a first online social network account of an online social network;
   tracking posts on a second online social network account of the online social network via the first online social network account associated with the HVAC controller, wherein the second online social network account is associated with a user;
   identifying a natural language post of the tracked posts on the second online social network account, via a network, as being related to the HVAC system;
   translating the identified natural language post into a command understandable by the HVAC controller of the HVAC system using translation software stored in non-transitory computer readable medium, the command causing a setpoint of the HVAC controller to change to a commanded setpoint; and
   executing the command by the HVAC controller causing the HVAC controller to control the HVAC system in accordance with the commanded setpoint.

2. The method of claim 1, further comprising:
   posting an indication on the second online social network account in response to action taken by the HVAC system in accordance with the command.

3. The method of claim 1, wherein the translation software is executed by the HVAC controller.

4. The method of claim 1, wherein translation software is executed by a server to produce the command, and wherein the server provides the command to the HVAC controller via a network connection.

5. The method of claim 4, wherein the server is an HVAC web services server, and the HVAC controller communicates with the HVAC web services server through an HVAC web services interface protocol.

6. The method of claim 5, wherein the HVAC web services interface protocol is a web services application programming interface (API).

7. The method of claim 1, wherein the translation software is executed in the cloud to produce the command, and wherein the cloud provides the command to the HVAC controller.

8. The method of claim 1, wherein the network includes the Internet.

9. The method of claim 1, wherein the HVAC controller is a thermostat.

10. The method of claim 1, further comprising:
    identifying a first natural language post of the tracked posts on the second online social network account, via the network, as being related to the HVAC system, where the first natural language post is a command post that is not recognizable by the HVAC controller as a command;
    identifying a second natural language post of the tracked posts on the second online social network account, via the network, as being related to the HVAC system, where the second natural language post is a non-command post that is not recognizable by the HVAC controller as a command;

interpreting the intent behind the identified first natural language post and the intent behind the second natural language post;
based on the respective intents, translating the first natural language post into a first HVAC controller command that implements the intent behind the first natural language post and translating the second natural language post into a second HVAC controller command that implements the intent behind the second natural language post, wherein the first HVAC controller command and the second HVAC controller command are recognizable by the HVAC controller for controlling the HVAC system; and
wherein when the first and second natural language posts are interpreted as having the same intent in the interpreting step, the same HVAC controller command is identified for each of the first and the second natural language posts.

* * * * *